(12) United States Patent
Fujita (10) Patent No.: US 8,830,809 B2
(45) Date of Patent: Sep. 9, 2014

(54) OPTICAL INFORMATION RECORDING DEVICE

(71) Applicants: Hitachi-LG Data Storage, Inc., Tokyo (JP); Hitachi Consumer Electronics Co., Ltd., Tokyo (JP)

(72) Inventor: Kouji Fujita, Yokohama (JP)

(73) Assignees: Hitachi-LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/890,527

(22) Filed: May 9, 2013

(65) Prior Publication Data

US 2014/0064049 A1 Mar. 6, 2014

(30) Foreign Application Priority Data

Aug. 31, 2012 (JP) ................................ 2012-190867

(51) Int. Cl.
*G11B 7/00* (2006.01)
*G11B 7/09* (2006.01)
*G11B 7/24044* (2013.01)
*G11B 7/24062* (2013.01)

(52) U.S. Cl.
CPC .......... *G11B 7/0917* (2013.01); *G11B 7/24044* (2013.01); *G11B 7/24062* (2013.01)
USPC ...................................... 369/103; 369/44.37

(58) Field of Classification Search
None
See application file for complete search history.

(56) References Cited

U.S. PATENT DOCUMENTS

| | | | |
|---|---|---|---|
| 2006/0153044 A1* | 7/2006 | Hayashi et al. | 369/103 |
| 2007/0146838 A1* | 6/2007 | Toishi et al. | 359/11 |
| 2007/0153344 A1* | 7/2007 | Lin et al. | 359/25 |
| 2008/0037083 A1* | 2/2008 | Ogasawara | 359/3 |
| 2008/0043596 A1* | 2/2008 | Noguchi et al. | 369/103 |
| 2009/0080315 A1* | 3/2009 | Kanamaru et al. | 369/103 |
| 2009/0245037 A1* | 10/2009 | Ueda | 369/44.13 |
| 2010/0296374 A1* | 11/2010 | Yamatsu et al. | 369/103 |

FOREIGN PATENT DOCUMENTS

JP 2007-304263 11/2007

* cited by examiner

*Primary Examiner* — Thang Tran
(74) *Attorney, Agent, or Firm* — Antonelli, Terry, Stout & Kraus, LLP.

(57) ABSTRACT

An optical information recording/reproduction device includes a detection unit which detects a focus-direction height of a recording medium, a focus adjustment unit which adjusts a focus-direction distance between the recording medium and a signal light optical system and a reference light system, and a control unit which controls the focus adjustment unit so that a relative distance between the object lens of the signal light optical system and the recording medium is adjusted according to the focus-direction height of the recording medium detected by the detection unit.

8 Claims, 11 Drawing Sheets

ОPTICAL INFORMATION RECORDING DEVICE

INCORPORATION BY REFERENCE

The present application claims priority from Japanese application JP2012-190867 filed on Aug. 31, 2012, the content of which is hereby incorporated by reference into this application.

BACKGROUND OF THE INVENTION

The present invention relates to an optical information recording device that records information on a recording medium using a holographic memory.

Today, an optical disc with a recording density on the order of 128 GB is produced on a commercial basis according to the Blu-ray Disc (trademark) standard in which a blue-violet semiconductor laser is used. In future, a still larger capacity is desired by taking advantage of the ability to conserve data for long periods of time that is one of the merits of an optical disc. The problem with the technology described above is that increasing the recording density on a disc surface is approaching the limit. Realizing a super-dense recording, such as 1 TB or higher per one disc, on an optical disc requires a new high-density recording technology that is different from the high-density recording technology based on a shorter wavelength and an object lens with higher NA. The study has been conducted on the next-generation storage technology and, in particular, attention has been paid to the hologram recording technology that records digital information using hologram.

A technology for positioning a recording medium at a reproduction time is disclosed, for example, in JP-A-2007-304263. This document describes that "the signal for driving a holographic memory in the focus direction, radial direction, and tangential direction is generated based on the FE signal, RE signal and TE signal, and this signal is applied to the actuator that three-dimensionally drives the holographic memory.

By doing so, a positioning error in the hologram, which is reproduced, in the focus direction, radial direction, and tangential direction is corrected.

SUMMARY OF THE INVENTION

The two light fluxes, reference light and signal light, for recording information on a recording medium enter the recording medium, each with an independent angle with respect to the recording medium. Therefore, the focus adjustment mechanism such as the one described in JP-A-2007-304263, which uses an optical lens and acquires the servo error signal through the reflection of the signal light, has an effect on the shape of the interference pattern of hologram. This is not desirable from the viewpoint of signal quality. On the other hand, when the recording position on a recording medium is changed, when a recording medium is removed from a drive and then mounted on the same drive again, or when a recording medium is mounted on another drive, the distance between the signal light exiting lens and the recording surface of the recording medium varies. The problem is that this variation in the distance decreases the recording performance of hologram.

It is an object of the present invention is to improve the problem described above. More specifically, an object is to provide an optical information recording/reproduction device that records information on a recording medium correctly.

The above problem is improved, for example, by the configuration described in claims.

The present invention appropriately controls the distance between the signal light exiting lens and the recording surface of a recording medium, thus implementing reliable hologram recording.

Other objects, features and advantages of the invention will become apparent from the following description of the embodiments of the invention taken in conjunction with the accompanying drawings.

DETAILED DESCRIPTION OF THE EMBODIMENTS

Embodiments of the present invention will be described with reference to the drawings.

[First Embodiment]

Figure 1:
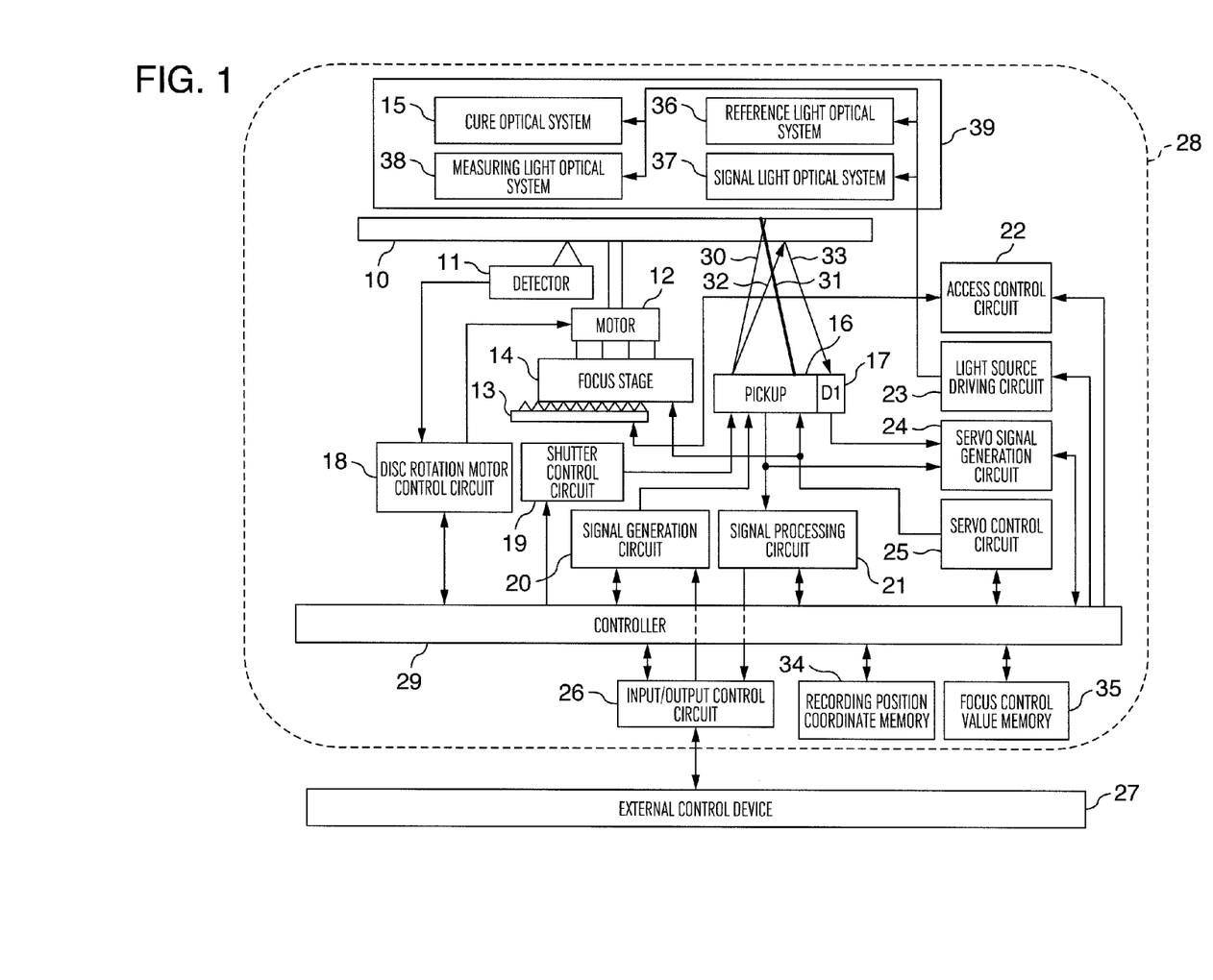
FIG. 1 is a diagram showing an embodiment of an optical information recording/reproduction device.

FIG. 1 is a diagram showing an optical information recording/reproduction device that records and reproduces digital information using hologram. The hologram recording technology records information on a recording medium as follows. The technology causes a signal light, which has page data information two-dimensionally modulated by a spatial light modulator, to intersect with a reference light in a recording medium and, then, performs refractive-index modulation in the recording medium using an interference pattern formed at that time. To reproduce information, the reference light used at recording time is shone on the recording medium to cause the hologram, recorded in the recording medium, to work as a diffracted grating for generating a diffracted light. This diffracted light reproduces the recorded signal light, as well as the phase information, as the same light. From the reproduced signal light, two-dimensional information is detected using an image light detector such as a CCD. Because multiple pieces of page data can be overwritten in the same position in a recording medium, a large amount of information can be recorded and reproduced at a high speed.

An optical information recording/reproduction device 28 includes a cure optical system 15, a reference light optical system 36, a signal light optical system 37, and a measuring light optical system 38 in a pickup 16 as an optical system unit 39. The optical information recording/reproduction device 28 also includes a disc rotation angle detector 11 and a rotation motor 12. A recording medium 10 is configured to be rotated by the rotation motor 12.

A reference light 31 and a signal light 30, which are output from the pickup 16, enter the recording medium 10 each with an independent incident angle and record digital information in the recording medium 10 using hologram formed by optical interference generated by the two independent light fluxes. The recorded information signal is sent to a spatial light modulator in the pickup 16 by a controller 29 via an input/output control circuit 26 and a signal generation circuit 20, and the signal light is modulated by the spatial light modulator.

To reproduce information recorded in the recording medium 10, a light is generated by the reference light optical system 36 to cause the reference light, output from the pickup 16, to enter the recording medium 10 in the direction opposite to the direction at the recording time. The reproduced light reproduced by the reproduction reference light is detected by a light-detector in the pickup 16, and the signal is reproduced by a signal processing circuit 21.

The exposure time, during which the reference light and the signal light are exposed to the recording medium 10, can be adjusted by controlling the open/close time of the shutter in the pickup 16 by the controller 29 via a shutter control circuit 19.

The optical information recording/reproduction device 28 is connected to an external control device 27 via the input/output control circuit 26. When information is recorded, the optical information recording/reproduction device 28 receives the recording information signal from the external control device 27 via the input/output control circuit 26. When information is reproduced, the optical information recording/reproduction device 28 sends the reproduced information signal to the external control device 27 via the input/output control circuit 26.

The cure optical system 15 generates an optical beam used for the pre-cure and post-cure of the recording medium 10. The pre-cure refers to a pre-process in which, before the reference light and the signal light are directed to a desired position, a predetermined optical beam is directed to the desired position when information is recorded in the desired position in the recording medium 10. The post-cure refers to a post-process in which, after information is recorded at a desired position in the recording medium 10, a predetermined optical beam is directed to the desired position to prevent data from being appended thereto.

The disc rotation angle detector 11 is used to detect the rotation angle of the recording medium 10. To position the recording medium 10 at a predetermined rotation angle, the disc rotation angle detector 11 detects the signal according to the rotation angle and, using the detected signal, the controller 29 controls the rotation angle of the recording medium 10 via a disc rotation motor control circuit 18. When hologram is recorded, the recording medium 10 must be in the stopped state. When hologram recording at the current position is completed, the rotation angle of the recording medium 10 is changed and the positioning operation for the next unrecorded area is performed. The rotation operation of the recording medium is performed by repeatedly stopping and starting the recording medium.

A predetermined light source driving current is supplied from a light source driving circuit 23 to the light source of the reference light optical system 36, signal light optical system 37, cure optical system 15, and measuring light optical system 38 to cause each light source to emit an optical beam with a predetermined light volume. A focus stage 14, motor 12, detector 11, and recording medium 10, all of which are mounted on a slider 13, are movable in the radial direction of the recording medium 10 with respect to the pickup 16 to allow the recording or reproduction position to be changed. This is accomplished by sending the driving signal from an access control circuit 22 to the slider 13.

For hologram recorded in the angular multiplexing mode, the allowable errors for the optical axis tolerance and the positioning tolerance at reproduction time are extremely small. For example, the reference light angle positioning tolerance is ±0.005 degrees or smaller, the two-dimensional positioning tolerance on the recording medium 10 is ±5 µm, and the focus height positioning tolerance is ±10 µm or smaller. The reference light optical system 36 controls the angle of the rotary mirror unit, which controls the reference light axis, and the angle of galvano mirrors 59 and 64 that have the rotation driving unit. The encoder angle information according to the mirror angle is sent from the pickup 16 to a servo signal generation circuit 24, and the angle information on the galvano mirror is sent to the controller 29. A servo control circuit 25 receives the target angle displacement information on the galvano mirror from the controller 29 and receives the galvano mirror angle control signal as the galvano mirror driving signal in the pickup 16.

Positioning at a recording or reproduction position on the recording medium 10 is controlled through the rotation angle positioning control of the motor 12 and the radial-direction positioning control of the slider 13. For example, the rotation angle positioning on the recording medium is controlled by the motor 12 in such a way that rotation positioning is performed for the rotation angle of the recording medium in increments of 0.3 degrees and, at that position, the operation moves to the stop control of the motor 12. The encoder, which provides the rotation angle position information, radially provides optical slits along the inner circumference of the recording medium 10. The detector 11 reads the encoder and sends the rotation angle position information to the disc rotation motor control circuit 18. The disc rotation motor control circuit 18 outputs the positioning control signal, corresponding to the target rotation angle, to the motor 12.

Radial positioning is controlled by providing a linear encoder in the radial direction of the recording medium 10 and sending the linear encoder signal, corresponding to the target movement position of the slider 13, to the access control circuit 22. In response to the position information specified by the controller 29, the access control circuit 22 positions the slider 13 at a desired position. By moving the slider 13, the focus stage 14, motor 12, and recording medium 10 can access the recording medium in the radial direction in relation to the pickup 16.

Next, the following describes how to control the distance between the pickup 16 and the surface of the recording medium 10 (hereinafter called a focus height). The two light fluxes, reference light and signal light, enter the recording medium 10, each with an independent angle. The focus adjustment mechanism in which an optical lens is used for the signal light, if employed, results in a change in the shape of the interference pattern generated by the two light fluxes. This means that the focus adjustment mechanism in which an optical lens is used cannot be used. To solve this problem, the focus height is controlled such that the distance between the reference position of the pickup 16 and the surface of the recording medium 10 becomes constant or the height of the pickup 16 itself becomes constant. That is, any focus height adjustment method may be used if the relative distance between an object lens 55 of the signal light optical system 37 and the recording medium 10 can be adjusted. In the embodiment described below, an example of the focus adjustment mechanism for adjusting the height of the recording medium 10 is described.

Figure 2A:
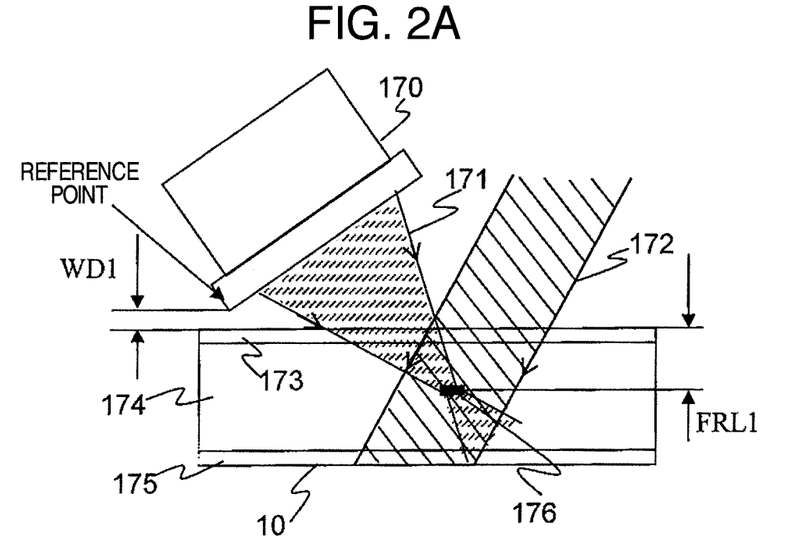
FIG. 2A is a diagram showing a correct hologram recording position in the optical information recording/reproduction device.
Figure 2B:
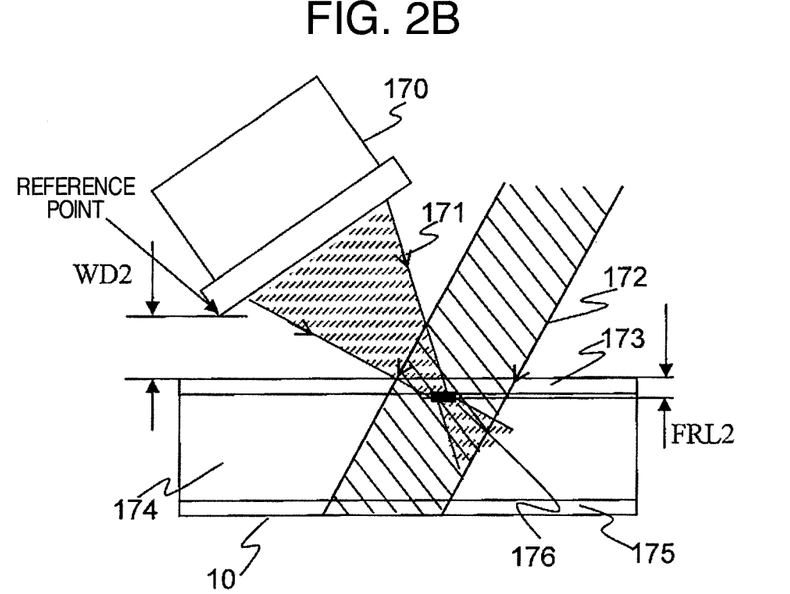
FIG. 2B is a diagram showing an incorrect hologram recording position.

FIG. 2A and FIG. 2B are diagrams showing a recording-time focus height versus a hologram recording position. The figures show hologram formation positions in the recording medium 10. The recording medium 10 includes a transparent cover layer 173, a recording layer 174, and a transparent protection layer 175. In a part where a signal light 171, output from a signal light lens unit 170, intersects with a reference light 172, an optical interference pattern is formed and a Fourier surface 176 is recorded in the recording layer 174. FIG. 2A shows the case in which the focus height adjustment is correct while FIG. 2B shows the case in which the focus height adjustment is incorrect. With an optical part nearest to the surface of the recording medium 10 (for example, end of the signal light lens unit 170) as the reference point of the pickup 16, let WD1 be the distance to the surface of the recording medium 10. FIG. 2A shows that hologram is recorded with WD1 adjusted to a correct focus height, for example, 0.8 mm±10 μm. On the other hand, FIG. 2B shows the case in which the recording medium 10 is lower than the reference point of the pickup 16, in which case the distance to the surface of the recording medium 10 is represented by WD2 with the result that hologram is recorded near the surface. As shown above, the height at which hologram is recorded varies. That is, when the recording position on the recording medium 10 is changed, when the recording medium 10 is removed from the optical information recording/reproduction device 28 and then mounted on the same drive again, or when the recording medium 10 is mounted on another drive, the focus height varies. As a result, the problem is that the hologram and the recording position of a Fourier surface 176 vary largely in the depth direction of the recording medium 10.

As compared with the focus height reference value at recording time, the focus height control accuracy at reproduction time is very small, for example, the tolerance is ±10 μm for the WD of 0.8 mm. Therefore, the hologram formed at the intersection between the reference light and the signal light at recording time must be recorded in the same depth in the recording medium 10.

Focus height adjustment vertically moves the recording medium 10 and the motor 12 mounted in the focus stage 14 shown in FIG. 1. The distance between the surface of the recording medium 10 and the pickup 16 is measured by the measuring light optical system 38 by outputting a light, for example, a measuring light 32 with the wavelength of 680 nm to which the recording medium 10 is not sensitive, from the pickup 16. The focus height is measured by receiving a surface reflected light 33 of the recording medium 10 via the measurement light reception unit (D1) 17.

The surface of the recording medium 10 is covered by a coating material that reflects a light with a particular wavelength, for example, with a wavelength of 500 nm or longer. A measuring light with the wavelength of 680 nm is reflected on the surface of the recording medium 10, and the signal light and the reference light, both of which have the wavelength of 405 nm, enter the recording layer. The focus height measurement result is sent from a measurement light reception unit 17 to the servo signal generation circuit 24, and the focus error servo signal, generated by comparing the target focus height information and the focus height measurement result, is sent to the controller 29. The controller 29 sends the focus height adjustment signal to the servo control circuit 25 when the focus height is adjusted, for example, when the recording or reproduction operation is not performed. Next, the servo control circuit 25 sends the driving signal, which moves the focus stage 14 vertically, to set the focus height to the target height. When the height of the recording medium 10 is controlled by using the mechanism of the focus stage 14, the vibration generated at mechanism driving time, as well as its vibration harmonics, vibrates the focus stage 14. For example, if vibration amplitude, which is about ½₀ of the amplitude of the signal light with the wavelength of 405 nm, is generated while hologram is photo-recorded in the recording medium 10, hologram recording cannot be performed correctly. To avoid this condition, the controller 29 sends an instruction signal to the servo control circuit 25 to hold the focus stage 14 control signal from the servo control circuit 25 during recording or reproduction. This signal is sent to eliminate a small control error in the recording medium 10 that may be caused by controlling the focus height during recording or reproduction. At least, the recording medium 10 must be in the stationary state while hologram is photo-recorded in the recording medium 10. The hold operation of the focus stage 14 control signal may also be performed while hologram is recorded in, or reproduced from, a recording medium.

Figure 3:
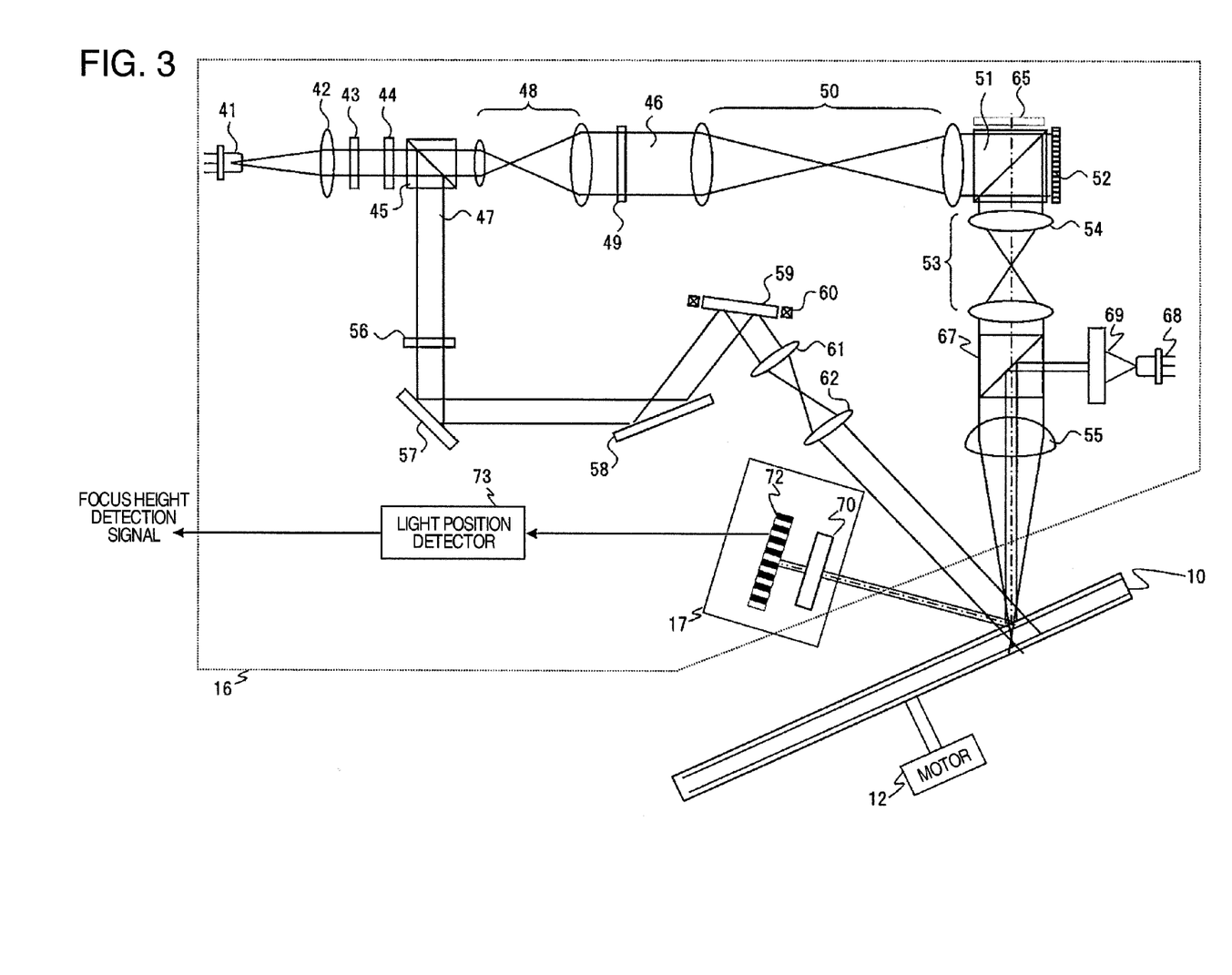
FIG. 3 is a diagram showing an embodiment of a recording pickup in the optical information recording/reproduction device.

Next, with reference to FIG. 3, the following describes the hologram recording optical system and the focus height measurement optical system. FIG. 3 shows the optical system configuration of the pickup 16 in the optical information recording/reproduction device 28. An optical beam emitted from a light source 41 transmits through a collimator lens 42 and enters a shutter 43. When the shutter 43 is open, the optical beam passes through the shutter 43. After the polarization direction is adjusted by a ½ wavelength plate 44 so that the optical volume ratio between the p-polarized light and the s-polarized light becomes a desired ratio, the optical beam enters a polarized beam splitter 45. The optical beam, which transmits through the polarized beam splitter 45, works as a signal light 46. After the optical beam radius is expanded by a beam expander 48, the optical beam transmits through a phase mask 49, a relay lens 50, and a polarized beam splitter prism 51 and enters a spatial light modulator 52. The signal light, to which information is added by the spatial light modulator 52, reflects on the polarized beam splitter prism 51 and propagates optical information through a relay lens 53. After that, the signal light converges on the recording medium 10 via the object lens 55. The optical beam, which is reflected by the polarized beam splitter 45 works as a reference light 47. After the polarization direction is set to a predetermined direction by a polarization direction conversion device 56 according to the recording operation or the reproduction operation, the reference light enters a galvano mirror 59 via a mirror 57 and a mirror 58. Because the angle of the galvano mirror 59 can be adjusted by an actuator 60, the incident angle of the reference light, which enters the recording medium 10 after passing through a lens 61 and a lens 62, can be set to a desired angle. In this way, the signal light and the reference light enter the optical information recording medium 10 in such a manner that they intersect with each other on the recording medium 10, an interference pattern is formed in the recording medium. By writing this pattern in the recording medium, the information is recorded. The ability of the galvano mirror 59 to change the incident angle of the reference light, which enters the optical information recording medium 10, allows a plurality of pieces of hologram information to be angular-multiplexed at the same position in the recording medium. In the description below, for hologram recorded in the same area with different reference light angles, hologram corresponding to each reference light angle is called a page and a set of pages recorded in the angular-multiplexed mode in the same area is called a book.

Next, the following describes the optical system for measuring the focus height. A measuring light used at recording time is generated by emitting a light with a wavelength to which the recording medium is not sensitive, for example, a wavelength of 680 nm, from a light source 68 via a beam shape parallel-light lens 69. This measuring light is combined with the signal light by a prism 67 and is directed from the object lens 55 to the recording medium 10. The signal light with the wavelength of 405 nm transmits through the surface of the recording medium, but the measuring light with the wavelength of 680 nm is reflected on the surface of the recording medium. The reflected measuring light enters a focus height detector 72 via a receiver lens 70.

Figure 4:
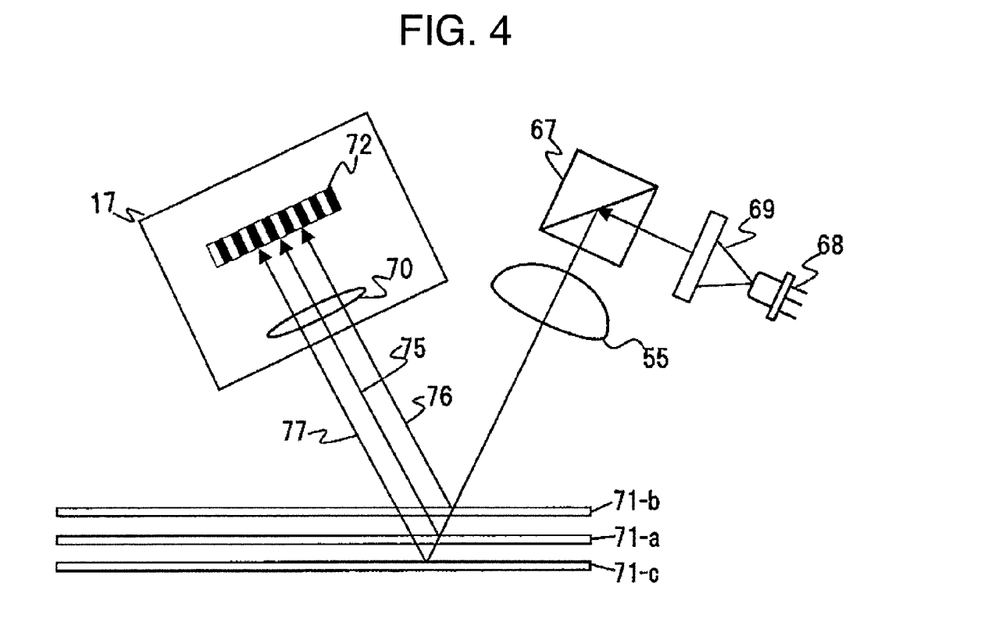
FIG. 4 is a diagram showing an embodiment of a focus height detector in the pickup in the optical information recording/reproduction device.

Next, the following describes the focus height relation between the focus height detector 72 and the recording medium 10 with reference to FIG. 4. The focus height detector 72 outputs the position information as an electrical signal based on the position of a received light spot. When the height of the recording medium is 71-a, 71-b, or 71-c, the respective regular reflection component, that is, a reflected light 75, a reflected light 76, or a reflected light 77, enters the focus height detector 72 via the receiver lens 70. The optical-axis incident position information on each reflected light is used as the focus height measurement information. The detection signal from the focus height detector 72 is output as a focus height detection signal via a light position detector 73.

Although reflected on the surface of the recording medium in the example described above, the measuring light with the wavelength of 680 nm may be reflected on a layer deeper than the recording layer with respect to the surface of the recording medium. That is, it is only required for the measuring light to have a smaller effect on hologram recording by providing a special layer in the recording medium, through which a light with the wavelength equal to that of the signal light and the reference light transmits, but which reflects a light with the wavelength of the measuring light. If this requirement is satisfied, it is possible that the special layer is provided on the surface of the recording medium or at a position deeper than the recording layer. It is only required for the measuring light to have a wavelength which is different from the wavelength of the signal light and the reference light and to which the recording medium is not sensitive. The wavelength is not always required to be 680 nm described in the above example.

Figure 5:
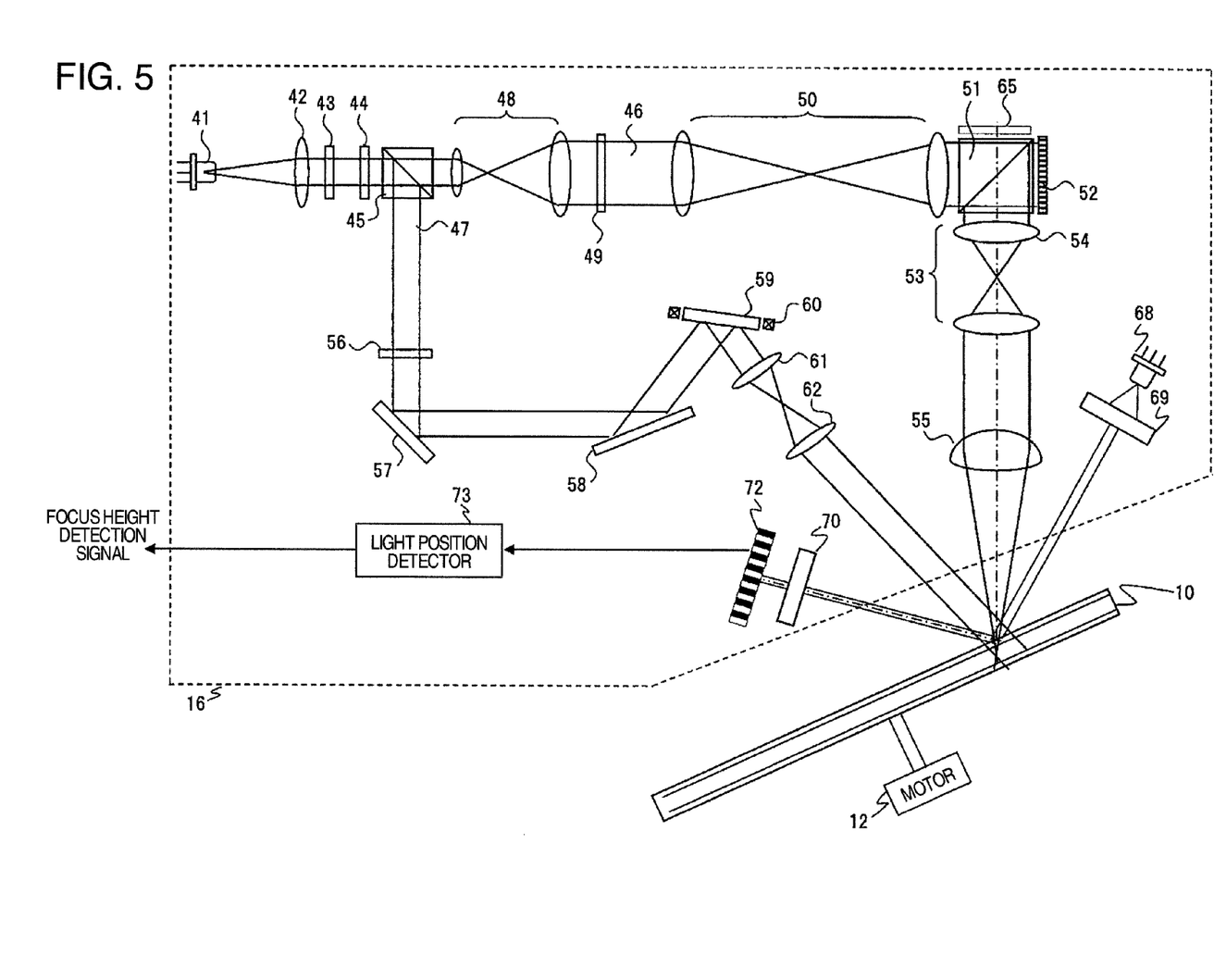
FIG. 5 is a diagram showing a modification of the recording pickup in the optical information recording/reproduction device.

FIG. 5 is a diagram showing a modification of the recording pickup in this embodiment. In FIG. 5, the arrangement of the focus height measurement optical system is different from that in the example in FIG. 3. The other configuration is similar to that in FIG. 3 and, therefore, the description is omitted. The focus height measurement optical system in FIG. 3 shows an example of the configuration in which the measuring light is combined with the signal light via the prism 67 to make it easier to direct a measuring light to the signal light focusing position. On the other hand, in FIG. 5, the focus height measurement optical system and the hologram recording optical system are arranged independently to prevent the light path of the measuring light and the light path of the signal light from being overlapped in the light path of each optical system. In the example in FIG. 3, the loss in the light volume of the signal light is generated in the prism 67. In contrast, arranging the optical system independently as shown in FIG. 5 enables the signal light to be directed to the recording medium more efficiently, allowing hologram to be recorded stably.

Figure 6:
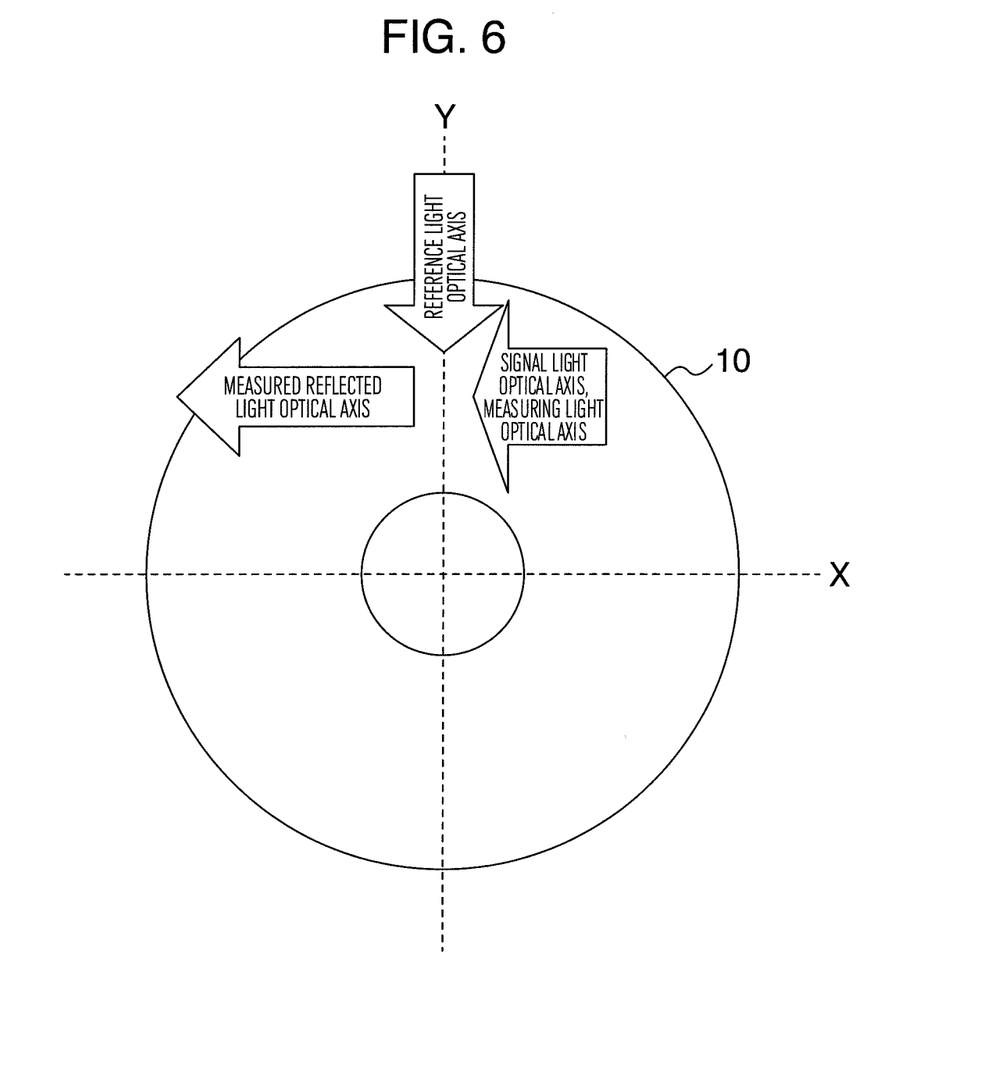
FIG. 6 is a diagram showing the relation between a recording medium and the directions of optical axes.

FIG. 6 shows an example of the arrangement of the measured reflected light optical axis, measuring light optical axis, signal light optical axis, and reference light optical axis. Because these optical axes enter, and reflect on, the recording medium 10 obliquely, the measuring light optical axis, signal light optical axis, and measured reflected light optical axis are arranged on the X-axis and the reference light optical axis is arranged on the Y-axis. The relative arrangement relation of the optical axes described above is exemplary only. As long as the arrangement of the optical mechanism is allowed, the reference light optical axis may be arranged in any direction to the signal light optical axis.

Figure 7:
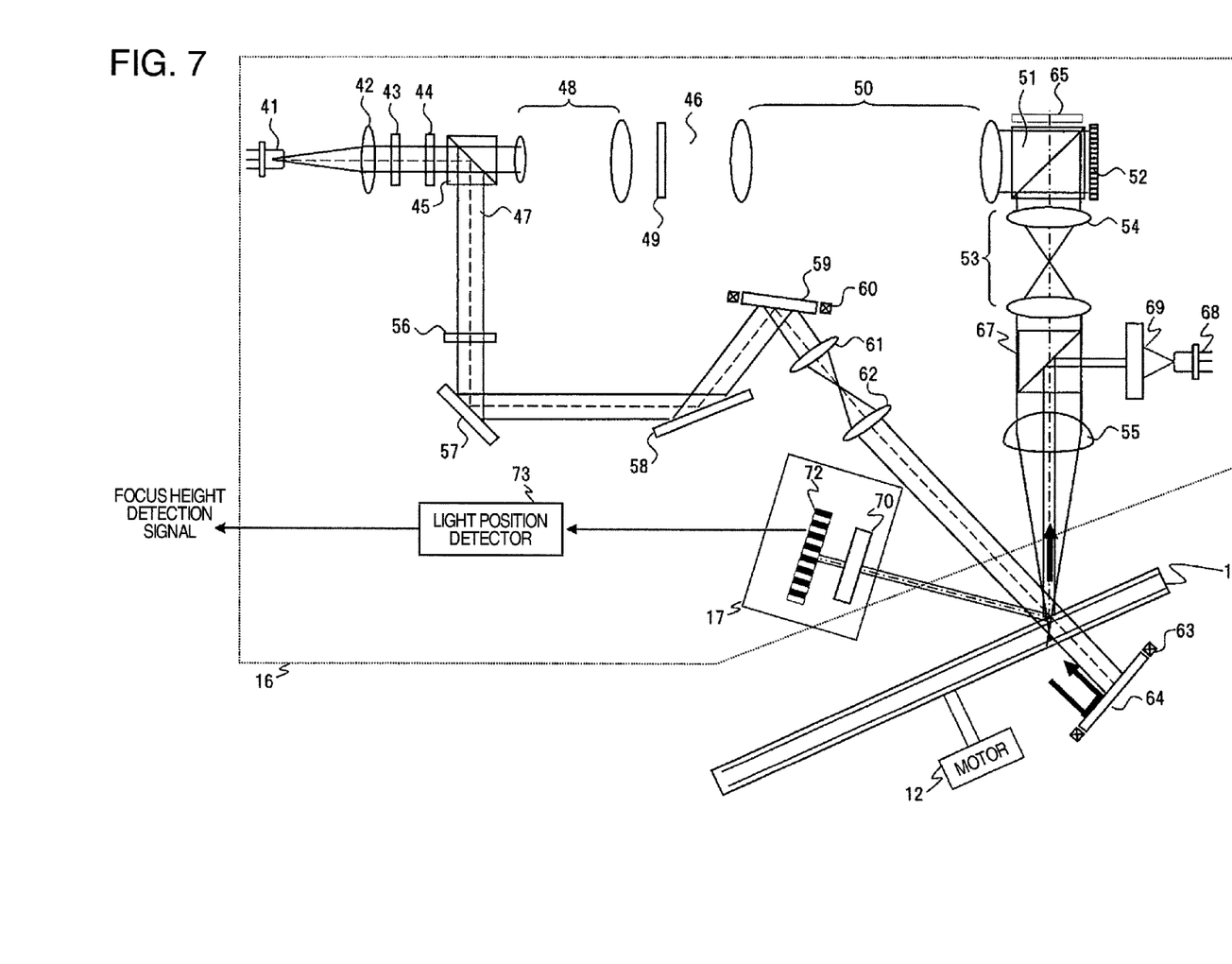
FIG. 7 is a diagram showing an embodiment of a reproduction pickup in the optical information recording/reproduction device.

FIG. 7 is a diagram showing the reproduction operation of the pickup 16 in the optical information recording/reproduction device 28. To reproduce recorded information, the reference light is directed to the recording medium 10, and the reproduction reference light is generated by reflecting the optical beam, which transmits through the recording medium 10, by a galvano mirror 64 whose angle can be adjusted by an actuator 63. The reproduced light, reproduced by means of the reproduction reference light, is propagated via the object lens 55 and the relay lens 53. After that, the reproduced light transmits through the polarized beam splitter prism 51 and enters a light-detector 65 where the recorded signal is reproduced. An imaging device, such as a CCD image sensor, may be used as the light-detector 65. In addition to this sensor, any device capable of reproducing page data can be used.

Next, the following describes the optical system for measuring the focus height at reproduction time. A measuring light used at reproduction time is the same as that used at recording time. A measuring light with a wavelength to which the recording medium 10 is not sensitive, for example, a wavelength of 680 nm, is generated from the light source 68 via the beam shape parallel-light lens 69. The generated measuring light has its light path changed by the prism 67 and enters the recording medium 10 from the object lens 55. The measuring light reflects on the surface of the recording medium and enters the focus height detector 72 via the receiver lens 70 for detecting the focus height. In the above embodiment, the optical axis of the measuring light is configured in the same manner as that of the signal light in order to detect the focus height of the position of the target hologram to be recorded or reproduced. Instead, the focus height of the position of hologram near the target may also be used, in which case, the measuring light may be configured to have an independent optical axis.

Figure 8:
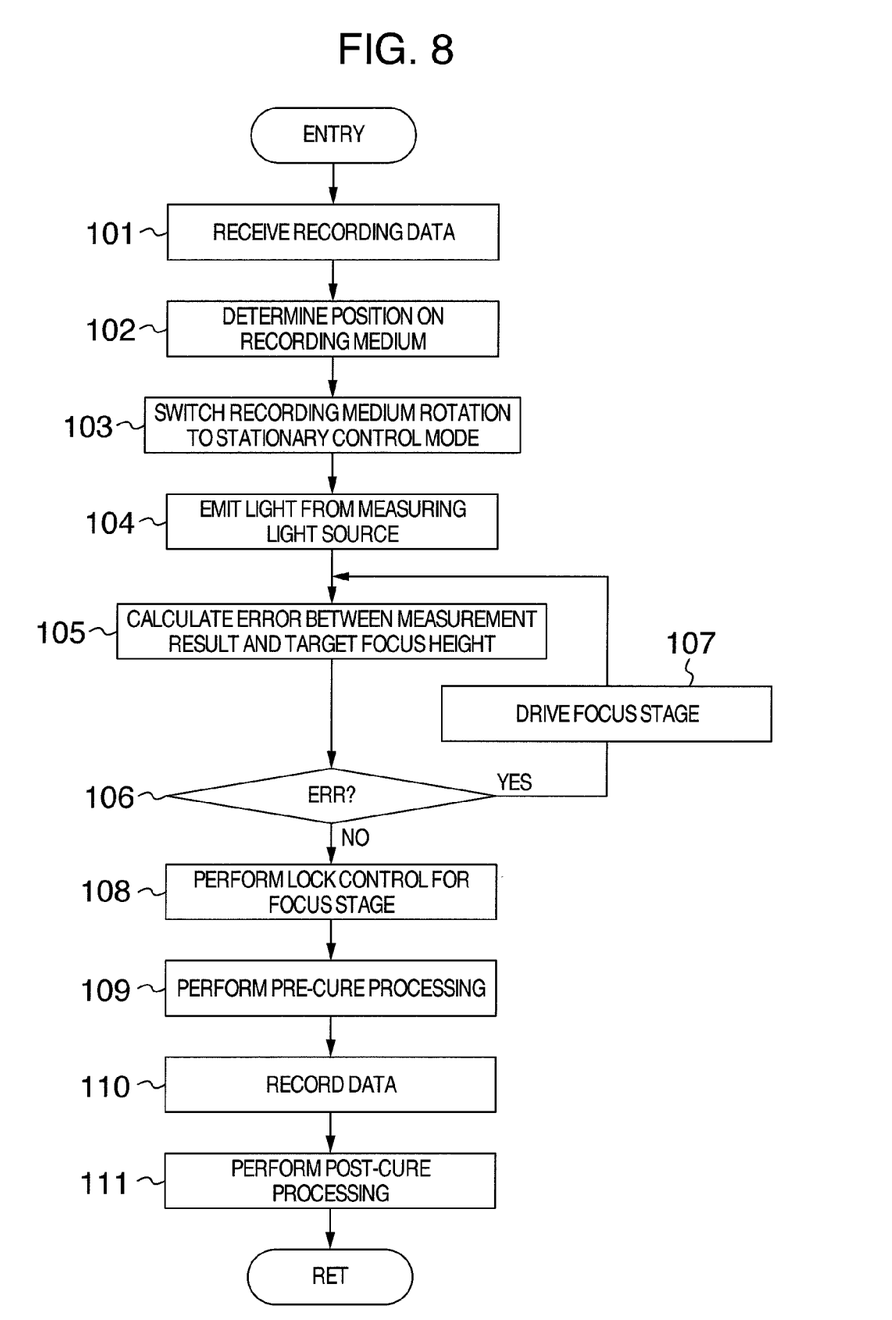
FIG. 8 is a diagram showing the recording operation flow of the optical information recording/reproduction device.

FIG. 8 is a flowchart showing the recording operation of the optical information recording/reproduction device 28. When recording data is received (101), the controller 29 determines the address information on the recording medium 10, determines the correspondence between the address information and the two-dimensional physical position information on the recording medium 10, such as the rotation angle of the recording medium and the radial position on the recording medium, and performs positioning on the recording medium (102). When one book of hologram is a 380 μm-square in size and the book is recorded at the 57 mm radial position, the rotation positioning angle per one book of hologram is 0.3 degrees.

When the positioning is completed, the rotation is switched to the stationary control mode (103). Next, a light is emitted from the measurement light source to measure the distance between the recording medium and the pickup (104), and the amount of error between the measurement result and the target focus height is calculated (105). If the adjusted focus height is not in the range of the target value (for example, 0.8 mm±10 μm), the focus stage 14 is driven vertically (107). The focus height measurement, the focus error calculation, and the adjustment driving operation of the focus stage 14 are repeated until the focus height reaches the target value. While the focus stage 14 is driven, the driving vibration of the stage sometimes generates a detection error in the focus height. In this case, after driving the focus stage 14, it is also possible to place the driving of the focus stage 14 once in the stationary control mode and, then, perform the measurement operation and the focus error calculation. After the focus height is set to the target value, the focus stage 14 is lock-controlled at the position that is set (108). The lock control refers to the operation in which the stage control loop operation based on the focus error signal is stopped and the focus stage 14 is held to the stage setting position in the stationary driving mode. The lock control is performed to eliminate a fluctuation in the setting, which may be generated in the height-direction control of the recording medium during hologram recording, and to ensure stable hologram recording. After the focus height adjustment is terminated, the pre-cure processing, which is the pre-recording processing for the recording medium, is performed (109) and, after that, the reference light and the signal light are directed to record data (110). Finally, the post-cure processing is performed (111) to prevent the recording medium from being exposed to light and, then, the recording processing is terminated.

According to the first embodiment described above, an optical system, in which the distance between the pickup reference position and the recording medium surface (focus height) is measured each time one book is recorded, is provided for use in page-recording type hologram recording where two light fluxes (signal light and reference light) are used. Using the measurement result, the focus height is adjusted to allow hologram to be recorded in the equal depth in the recording medium. Recording hologram in this manner enables the focus height to be adjusted at a high speed at reproduction time. In addition, the focus height adjustment operation is performed in such a way that the height setting value of the focus stage 14 is once held during the hologram recording operation or reproduction operation. By doing so, the vibration of the recording medium during focus height adjustment is reduced and, therefore, hologram can be recorded or reproduced stably.

Figure 9:
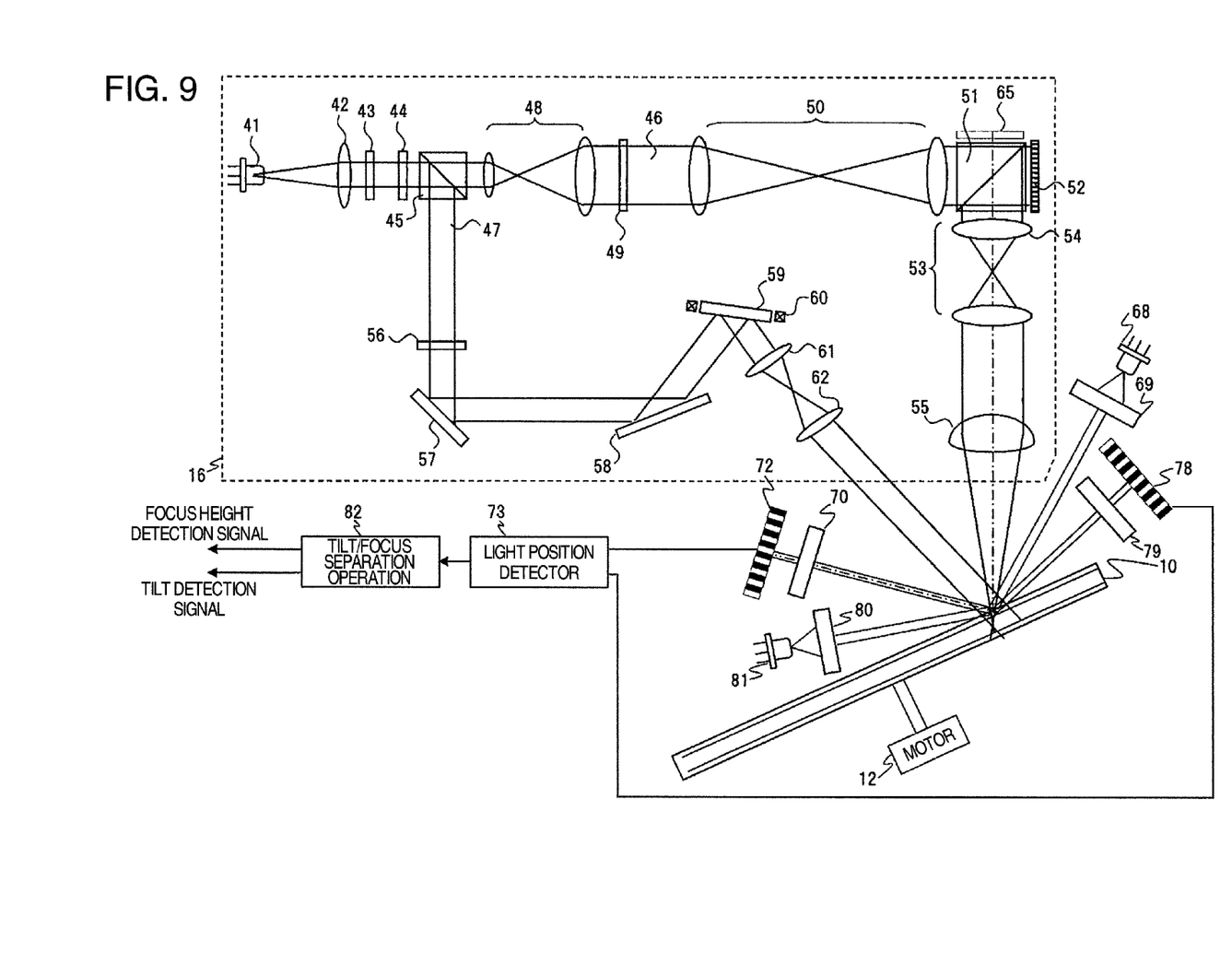
FIG. 9 is a diagram showing an embodiment of a recording pickup in the optical information recording/reproduction device.

Next, with reference to FIG. 9, the following describes an example of the focus height measurement optical system that measures the focus height using two measuring lights. The distance between the signal-light output lens and the recording-medium recording surface varies because of a change in distance caused due to a warp or a distortion in the disc when the recording position is changed or because of a chucking error generated when a recording medium is removed from a drive and then mounted on the same drive again. When such a change in distance is generated, the reflection angle of the measuring light directed to a position, where the recording medium is tilted largely, may be outside the assumed angle range when the focus-direction height of the recording medium is detected by the measuring light. That is, when a local distortion or warp on the recording medium becomes large, the measurement light reception unit 17 sometimes cannot receive a measuring light.

To solve this problem, the pickup shown in FIG. 9 employs a configuration in which two optical systems, each of which generates a measuring light, are provided. In the pickup shown in FIG. 9, a measuring light with the wavelength of 680 nm is emitted from each of the light sources 68 and 81 to generate the measuring light 1 and the measuring light 2. The measuring light 1 and the measuring light 2, reflected by the recording medium, are received by the focus height detectors 72 and 78 respectively. Each of the focus height detectors 72 and 78 outputs the position information as an electrical signal according to the position of the received light spot. The detection signal from each of the focus height detectors 72 and 78 is input to a tilt/focus separation operator 82 via the light position detector 73. The tilt/focus separation operator 82 separates the height component in the focus direction from the tilt component of the recording medium and detects them separately based on the position of the light spot received by the two focus height detectors 72 and 78. In response to the above input, the tilt/focus separation operator 82 outputs the focus height detection signal and the tilt detection signal.

As described above, a measuring light is directed to the recording medium from two directions in this configuration to detect not only a distance variation in the focus height direction but also a tilt component (tilting) of the recording medium. If the reflection angle of the measuring light 1 is not in the assumed angle range, the reflected light of the measuring light 2 is received. Conversely, if the reflection angle of the measuring light 2 is not in the assumed angle range, the reflected light of the measuring light 1 is received. This complementary relation between the measuring light optical systems increases the measurement margin for the tilt angle of the measuring light optical system even if there is a variation in the tilt direction of the recording medium, enabling the focus height of the recording medium to be measured more correctly.

[Second Embodiment]

The position change operation on the recording medium 10 is accomplished by the rotation angle positioning operation performed by the motor 12 and the positioning operation performed by the slider 13. The position change operation changes the mounting tilt state of the recording medium 10, or the distortion state of the recording medium 10 changes the focus height. For example, when the position is changed by the slider 13 from the radial position of 24 mm (inner circumference) to the radial position of 58 mm (outer circumference) of the recording medium, the focus height is changed 200 μm.

When the operation is continued with the recording medium 10 kept mounted on the axis of the motor 12, approximate reproducibility exists between the focus height and the position coordinates on the recording medium. Considering this reproducibility, the second embodiment is implemented in such a way that, after the focus height is adjusted for each book at recording time, the driving control value of the focus stage 14 is stored in a focus control value memory 35 with the driving control value of the focus stage 14 associated with the position coordinates on the recording medium. Each time the position on the recording medium is changed at reproduction time, the driving control value of the focus stage 14 corresponding to the coordinate position of the target position is read from the focus control value memory 35. The value that is read is used as the driving control value of the focus stage 14. When recording data is input from the external control device 27 to the input/output control circuit 26 in FIG. 1, the controller 29 determines the recording address. The recording address and the position coordinates on the recording medium are determined uniquely in advance. The position coordinate information corresponding to the address (for example, the rotation angle information on the recording medium 10 and the position coordinate information on the slider 13) are stored in advance in a recording position coordinate memory 34. When moving to a target position on the recording medium, the rotation angle positioning operation of the motor 12 and the positioning operation of the slider 13 are performed by referencing the position coordinate information that is read from the recording position coordinate memory 34 based on the recording address information.

On the other hand, the measurement result of the focus height is sent from the measurement light reception unit 17 to the servo signal generation circuit 24. The focus height error information, generated by comparing the target focus height information with the focus height measurement information, is sent to the controller 29. The controller 29 adjusts the focus height by sending the focus height adjustment signal to the servo control circuit 25, for example, when the recording operation and the reproduction operation are not performed. The servo control circuit 25 sends the driving signal to the focus stage 14 to set the focus stage 14 at the target focus height. After that, the driving signal value of the focus stage 14 is recorded in the focus control value memory 35 with the driving value associated with the position coordinate information on the recording medium. At reproduction time, the position coordinate information on the recording medium is read from the recording position coordinate memory 34 based on the reproduction address, the driving signal value of the focus stage 14 corresponding to the position coordinates is read from the focus control value memory 35, and the driving signal is sent to the focus stage 14. By doing so, the focus height approximately equal to the focus height at recording time can be obtained without repeating the focus height measurement operation and adjustment operation.

After that, to confirm the adjustment of the focus height again, the focus height measurement operation and the focus height error calculation operation are performed and, if focus height adjustment is required again, the operation proceeds to the focus height adjustment operation.

Figure 10:
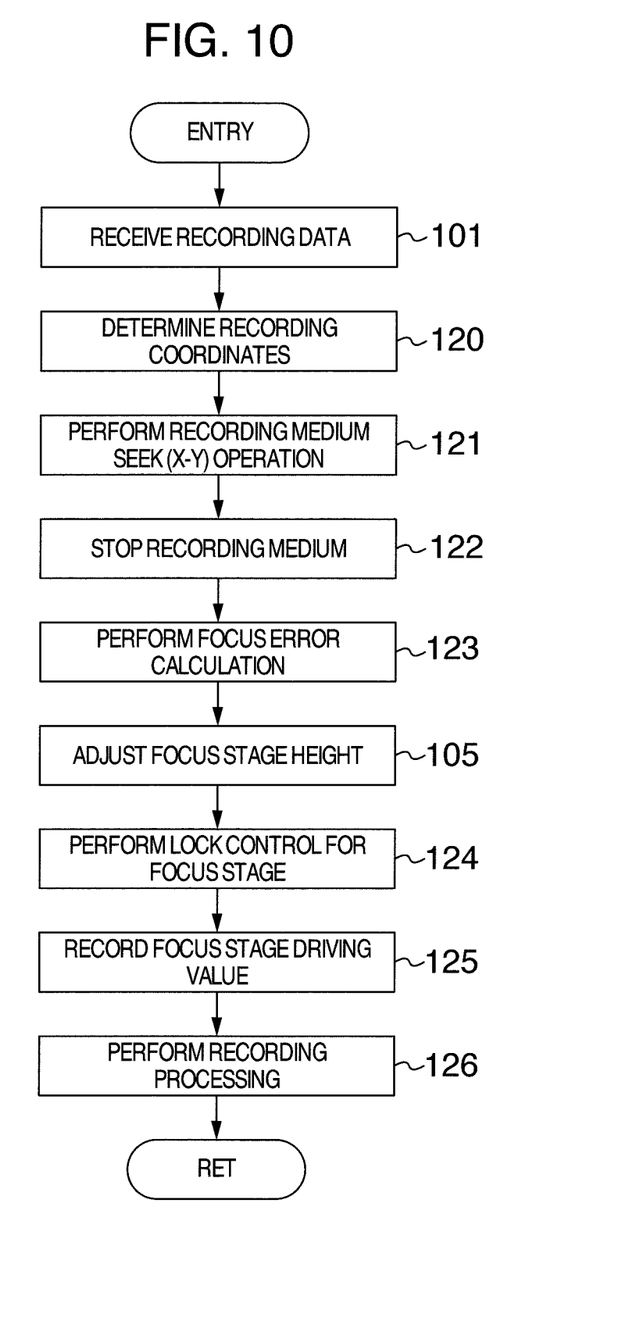
FIG. 10 is a diagram showing an embodiment of the recording operation flow in which control values of the optical information recording/reproduction device are stored.

With reference to FIG. 10, the operation flow at recording time is described below. When recording data is received (101), the controller 29 determines the address information on the recording medium 10 and reads the recording position coordinates on the recording medium 10, corresponding to the address information, from the recording position coordinate memory 34. When the recording position coordinates are determined (120), the recording medium seek (X-Y) operation (121) is performed to move to the recording target position. After moving to the recording target position, the recording medium is stopped (122). Next, the focus error calculation is performed (123). In this step, a sequence of processing is performed in which the distance between the recording medium surface and the pickup is measured and the amount of error between the target focus height and the measured result is calculated. If the adjusted focus height is not in the range of the target value (for example, 0.8 mm±10 μm), the focus stage 14 is driven vertically to adjust the focus stage height (105). After the height adjustment of the focus stage 14 is completed, the focus stage 14 is lock-controlled at the adjusted position (124). Next, the focus stage driving value recording processing (125) is performed in which the focus stage driving value is stored in the focus control value memory 35 with the position coordinate information on the recording medium associated with the control driving value of the focus stage 14 and, after that, the operation proceeds to the recording processing (126).

Figures 11A, 11B:
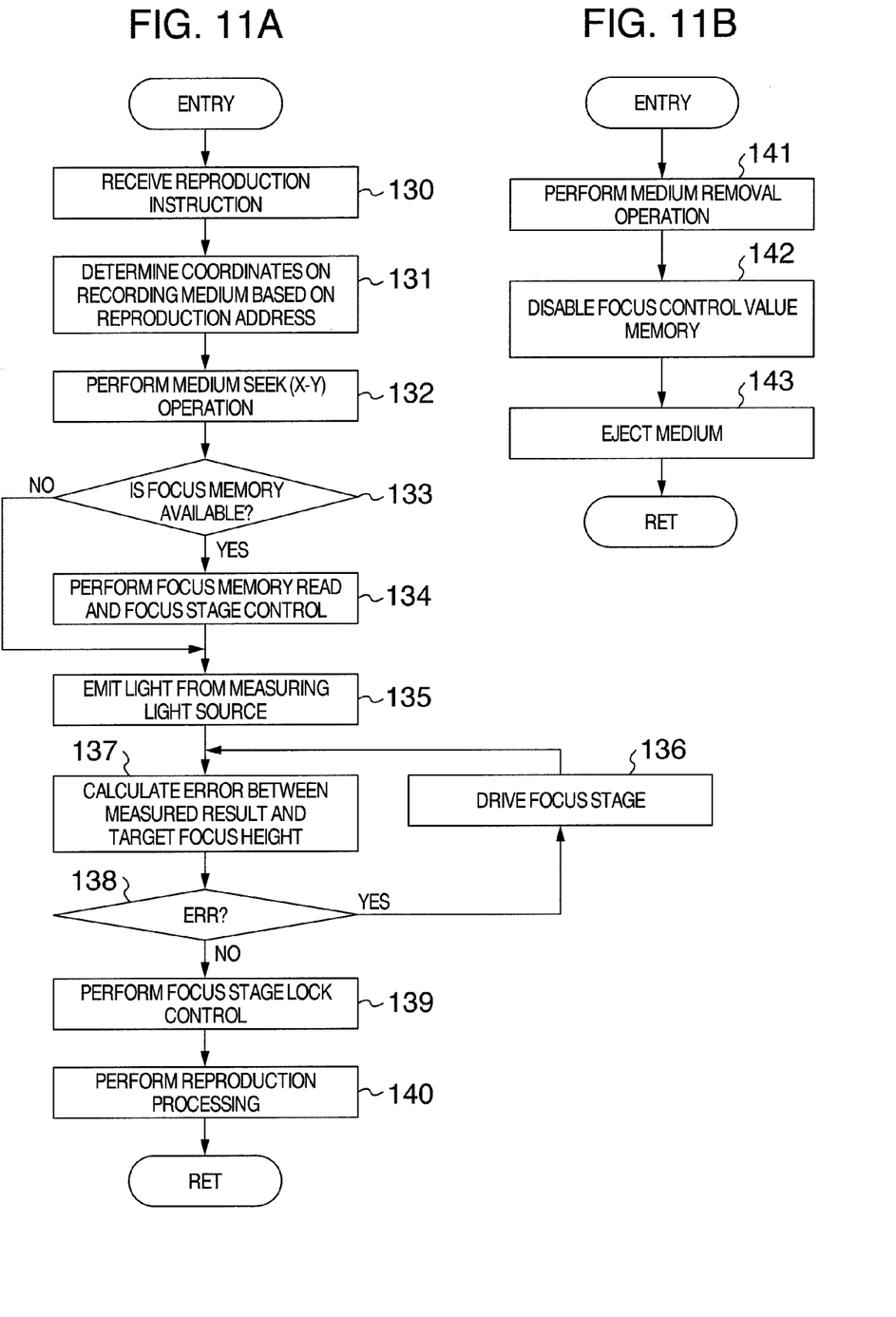
FIG. 11A is a diagram showing an embodiment of the reproduction operation flow of the optical information recording/reproduction device.
FIG. 11B is a diagram showing an embodiment of the memory data disabling operation flow of the optical information recording/reproduction device.

Next, with reference to FIG. 11A, the following describes the focus height adjustment flow of the focus stage 14 at reproduction time. When a reproduction instruction is received from the external control device 27 (130), the controller 29 reads the association information between reproduction addresses and recording position coordinates from the recording position coordinate memory 34 and determines the coordinates on the recording medium based on the reproduction address (131). When the target position coordinates of the destination are determined, the medium seek (X-Y) operation for the position coordinates of the target is performed (132) to seek the target position. Next, the focus memory availability determination is performed (133) to see if the information stored in the focus control value memory 35 is effective. The result of this determination is invalid if the information in the focus control value memory 35 is all cleared (0). It is also possible to provide a unique determination flag in the focus control value memory 35, in which case the determination flag is recorded at recording time and is read at reproduction time to determine whether the information is effective. If the determination result is effective, the focus memory read and focus stage control operation is performed (134) to read the information from the focus control value memory 35. After that, the data that is read is sent to the focus stage 14 as the control value of the focus stage 14. Next, a light is emitted from the measuring-light source (135) to measure the distance between the recording medium 10 and the pickup 16. In the measurement and focus error calculation processing (137), the amount of error between the measured focus height and the target focus height is calculated. The error determination processing (138), which is the processing to determine the amount of error, is performed. If the focus height is not in the range 0.8 mm±10 μm, the focus stage is driven (136). When the data read from the focus control value memory 35 is reflected on the focus stage 14, the focus height at recording time is approximately reproduced. Therefore, the adjustment operation of the focus stage 14, (137), (138), and (136), can be omitted or the adjustment of the focus stage 14 can be completed quickly.

After the focus height is set in the target value range, the focus stage lock control is performed (139) to hold the control value to a fixed value in the state that is set. When the adjustment of the focus stage is completed, the reproduction processing is performed (140).

Next, the operation to disable the focus control value memory 35 is described with reference to FIG. 11B. When a recording medium is removed and then mounted again, the state of engagement between the recording medium and the rotation axis of the motor 12 is changed. Therefore, the information stored in the focus control value memory 35 cannot be used as the control value of the focus stage 14. This means that the data in the focus control value memory 35 must be disabled at the same time a recording medium is removed. When the user performs the recording medium removal operation (141), the focus control value memory is disabled (142) and the recording medium is ejected (143).

In the second embodiment described above, the association between the position coordinate information on a recording medium and the control values of the focus stage 14 calculated by focus height adjustment is stored at recording time. At reproduction time, the control value of the focus stage 14 stored as described above and corresponding to the reproduction position coordinates is read for reflecting the control value on the focus stage 14. Reflecting the control value in this way reduces the need to repeatedly make the focus height adjustment operation, thus allowing the focus height to be adjusted quickly.

It should be understood that the present invention is not limited to the embodiments described above but includes various modifications. For example, the above embodiments are described in detail to make the present invention easy to understand and, therefore, the present invention is not limited to those that have all configurations described above. For example, the light source for measuring the focus height may be arranged independently of the pickup 16. The method for measuring the focus height is not limited to the optical method but any other measuring means may also be used. Regardless of the focus height, the similar processing may be performed also for the posture relation (for example, tilt) between the pickup 16 and the recording medium 10. It is also possible to replace a part of the configuration of an embodiment with the configuration of another embodiment or to add the configuration of an embodiment to the configuration of another embodiment.

The invention claimed is:

1. An optical information recording device which causes an interference between a signal light and a reference light to form an interference pattern and records the interference pattern on a recording medium, said optical information recording device comprising:
   a first laser beam source which emits a first laser beam;
   a signal light optical system which forms the signal light from the first laser beam and causes the signal light to enter the recording medium;
   a reference light optical system which forms the reference light from the first laser beam and causes the reference light to enter the recording medium;
   a second laser beam source which emits a second laser beam with a wavelength different from a wavelength of the first laser beam;
   a third laser beam source which emits a third laser beam with a wavelength different from the wavelength of the first laser beam;
   a first measuring light optical system which forms a first measuring light from the second laser beam and causes the first measuring light to enter the recording medium;
   a second measuring light optical system which forms a second measuring light from the third laser beam and causes the second measuring light to enter the recording medium;
   a first light receiving unit which receives a reflected light of the first measuring light which enters the recording medium;
   a second light receiving unit which receives a reflected light of the second measuring light which enters the recording medium;
   a detection unit which detects a focus-direction height of the recording medium based on a received signal received by said first light receiving unit and a received signal received by said second light receiving unit;
   a focus adjustment unit which adjusts a relative distance between an object lens of said signal light optical system and the recording medium; and
   a control unit which controls said focus adjustment unit so that the relative distance between the object lens of said signal light optical system and the recording medium is adjusted according to the focus-direction height of the recording medium detected by said detection unit.

2. An optical information recording device which causes an interference between a signal light and a reference light to form an interference pattern and records the interference pattern on a recording medium, said optical information recording device comprising:
   a first laser beam source which emits a first laser beam;
   a signal light optical system which forms the signal light from the first laser beam and causes the signal light to enter the recording medium;
   a reference light optical system which forms the reference light from the first laser beam and causes the reference light to enter the recording medium;
   a second laser beam source which emits a second laser beam with a wavelength different from a wavelength of the first laser beam;
   a measuring light optical system which forms a measuring light from the second laser beam and causes the measuring light to enter the recording medium;
   a light receiving unit which receives a reflected light of the measuring light which enters the recording medium;
   a detection unit which detects a focus-direction height of the recording medium based on a received signal received by said light receiving unit;
   a focus adjustment unit which adjusts a relative distance between an object lens of said signal light optical system and the recording medium;
   a control unit which controls said focus adjustment unit so that the relative distance between the object lens of said signal light optical system and the recording medium is adjusted according to the focus-direction height of the recording medium detected by said detection unit; and
   a storage unit which stores position information on the recording medium and information on the distance adjusted by said focus adjustment unit when information is recorded in the recording medium;
   wherein said control unit controls said focus adjustment unit so that the relative distance between the object lens of said signal light optical system and the recording medium is adjusted according to the position information and the information on the distance both of which is read from said storage unit.

3. The optical information recording device according to claim 2, further comprising:
   a medium ejection unit which ejects the recording medium from said optical information recording device wherein when the recording medium is ejected from said optical information recording device by said medium ejection unit, said control unit disables the position information and the information on the distance both of which are stored in said storage unit, and controls said focus adjustment unit so that the relative distance between the object lens of said signal light optical system and the recording medium is adjusted according to the focus-direction height of the recording medium detected by said detection unit.

4. The optical information recording device according to claim 1, wherein
   said first and second measuring light optical systems direct the first and second measuring lights to a position where the signal light enters the recording medium.

5. An optical information recording device which causes an interference between a signal light and a reference light to form an interference pattern and records the interference pattern on a recording medium, said optical information recording device comprising:
   a first laser beam source which emits a first laser beam;
   a signal light optical system which forms the signal light from the first laser beam and causes the signal light to enter the recording medium;
   a reference light optical system which forms the reference light from the first laser beam and causes the reference light to enter the recording medium;

a second laser beam source which emits a second laser beam with a wavelength different from a wavelength of the first laser beam;

a measuring light optical system which forms a measuring light from the second laser beam and causes the measuring light to enter the recording medium;

a light receiving unit which receives a reflected light of the measuring light which enters the recording medium;

a detection unit which detects a focus-direction height of the recording medium based on a received signal received by said light receiving unit;

a focus adjustment unit which adjusts a relative distance between an object lens of said signal light optical system and the recording medium; and a control unit which controls said focus adjustment unit so that the relative distance between the object lens of said signal light optical system and the recording medium is adjusted according to the focus-direction height of the recording medium detected by said detection unit;

wherein said measuring light optical system and said signal light optical system are arranged independently so that an optical path of the measuring light and an optical path of the signal light do not overlap in an optical path of each optical system.

6. The optical information recording device according to claim 1, wherein said focus adjustment unit adjusts the relative distance between the object lens of said signal light optical system and the recording medium by driving the recording medium in the focus height direction.

7. The optical information recording device according to claim 1, wherein said detection unit detects the focus-direction height of the recording medium based on a received signal of the measuring light reflected on the surface of the recording medium.

8. The optical information recording device according to claim 1, wherein said detection unit detects the focus-direction height of the recording medium based on a received signal of the measuring light reflected by a layer deeper than a recording layer with respect to the surface of the recording medium.

* * * * *